United States Patent [19]

Ichikawa et al.

[11] 4,416,716
[45] Nov. 22, 1983

[54] METHOD OF PRODUCING INTERIOR MATERIAL OF CORRUGATED CARDBOARD

[75] Inventors: Takashi Ichikawa; Sadao Moriyama, both of Yokohama, Japan

[73] Assignee: Ikeda Bussan Co., Ltd., Kanagawa, Japan

[21] Appl. No.: 405,238

[22] Filed: Aug. 4, 1982

[30] Foreign Application Priority Data

Aug. 27, 1981 [JP] Japan .................................. 56-134673

[51] Int. Cl.³ .............................................. B31F 1/36
[52] U.S. Cl. ..................................... 156/245; 156/196; 156/212; 156/224; 264/255; 264/267; 264/268; 264/269; 264/322; 264/340
[58] Field of Search ............... 156/210, 212, 213, 214, 156/224, 196, 245, 205; 264/549, 550, 215, 255, 232, 267, 268, 269, 322, 340

[56] References Cited

U.S. PATENT DOCUMENTS 3,682,762  8/1972  LeBlanc .............................. 156/210
3,687,767  8/1972  Reisman et al. .................... 156/205
4,145,239  3/1979  Fujii .................................... 156/214

Primary Examiner—Edward C. Kimlin
Assistant Examiner—Timothy W. Heitbrink
Attorney, Agent, or Firm—Pearne, Gordon, Sessions, McCoy, Granger & Tilberry

[57] ABSTRACT

This invention relates to a method of producing interior material of corrugated cardboard used for a ceiling of a car, for example.

Corrugated cardboard base material is plasticized by being heated and moistened while in a flat plane. Thereafter, the corrugated cardboard base material thus plasticized is pressed in a forming die having a low temperature such as a room temperature to be shaped in a predetermined manner. Afterward a covering sheet is disposed thereon having a thermally melting sheet provided thereon so as to be faced toward the corrugated cardboard base material thus shaped, they are pressed in the forming die to melt the thermally melting sheet by the preheated shaped corrugated cardboard base material to bond the covering sheet to the corrugated cardboard base material so as to produce interior material.

6 Claims, 6 Drawing Figures

METHOD OF PRODUCING INTERIOR MATERIAL OF CORRUGATED CARDBOARD

BACKGROUND OF THE INVENTION

In a prior method of producing interior material of corrugated cardboard, corrugated cardboard base material of a liner and a core with a thermally melting adhesive therebetween, and being at room temperature, is placed in a thermally forming die having a high temperature of 120° C. to 140° C., for example, to be pressed into a predetermined shape while the thermally melting adhesive is melted to bond the liner and the core to each other in the new shape. Afterward a covering sheet is disposed having a thermally melting sheet faced to the corrugated cardboard base material, they are pressed in the thermally forming die to melt the thermally melting sheet by the high temperature of the thermally forming die to bond the covering sheet to the corrugated cardboard base material. However, the prior art has many drawbacks. Firstly, since the corrugated cardboard base material being at room temperature is placed in the thermally forming die, it is possibly pressed before it is fully plasticized, because all of the flat cardboard does not contact the curved die. This causes the corrugated cardboard base material to have wrinkles and cracks produced. Secondly, since the thermally forming die is kept at the high temperature after the thermally melting sheet is melted, the shaped corrugated cardboard base material is possibly bent or deformed due to back spring thereof when it is removed out of the thermally forming die, and the liner and the core possibly are stripped off or partially separated. This causes the product to have a lower quality. Furthermore, since the corrugated cardboard base material is deformed under the high temperature of 120° C. to 140° C., for example, heat of vaporization is lost to lower the temperature of the corrugated cardboard base material. This requires heating it for a longer time and also cooling it after shaping it for a longer time. Thus, working time disadvantageously becomes longer. Finally, since the thermally forming die is used, the covering sheet has to be of heat-resistant material. This means that materials of the covering sheet are limited and also that the loss of heat becomes larger.

SUMMARY OF THE INVENTION

Accordingly, it is a principal object of the invention to provide a method of producing interior material of corrugated cardboard having no wrinkles and cracks produced.

It is another object of the invention to provide a method of producing interior material of corrugated cardboard which is not bent and deformed when removed out of a die with the result in a high quality of the product.

It is another object of the invention to provide a method of producing interior material of corrugated cardboard in an effective manner, resulting in its lower cost.

It is another object of the invention to provide a method of producing interior material of corrugated cardboard wherein a greater variety of materials usable as a covering sheet are usable.

In accordance with the invention, there is provided a method of producing interior material of corrugated cardboard comprising the steps of;

plasticizing corrugated cardboard base material by heating and moistening;

pressing the thus plasticized corrugated cardboard base material in a forming die of low temperature to shape it in a predetermined manner;

placing a covering sheet having a thermally melting sheet provided thereon so as to be faced toward the thus shaped corrugated cardboard base material;

and thereafter pressing said covering sheet in said forming die to melt said thermally melting sheet by the heat of said shaped corrugated cardboard base material to thereby bond said covering sheet to said shaped corrugated cardboard base material.

BRIEF DESCRIPTION OF THE DRAWING

The above and other objects and features of the invention will be apparent from the description of the embodiment taken along with reference to the accompanying drawing in which.

DETAILED DESCRIPTION OF THE EMBODIMENT

Figure 1:
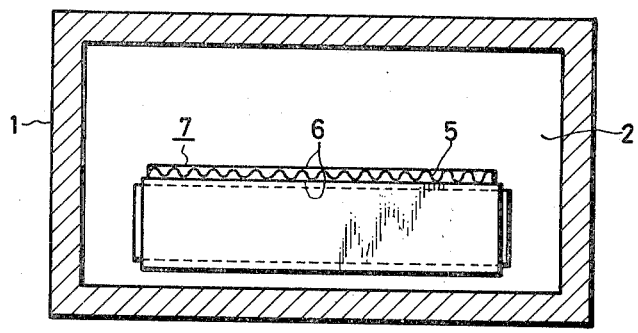
FIG. 1 illustrates a step of heating and moistening corrugated cardboard base material.
Figure 2:
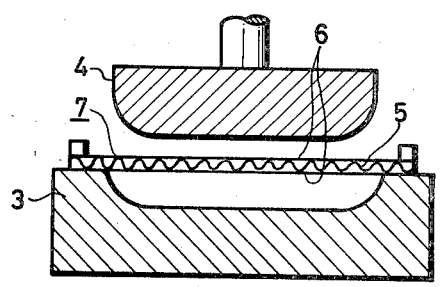
FIG. 2 illustrates a forming die with a lower die portion having the corrugated cardboard base material disposed thereon.

As shown in FIG. 1, corrugated cardboard base material 7 is placed while in a flat plane in a heating and moistening furnace or oven 1 to plasticize it. The corrugated cardboard base material 7 may comprise liners 6 and 6 and a core 5 disposed between the liners 6 and 6. It may be alternatively of one side liner type of multilayer type. An atmosphere 2 in the heating and moistening furnace 1 may have a heating temperature of 150° C. to 200° C. and a humidity of 5 to 20%. The reason that the corrugated cardboard base material is moistened as well as heated is that if it is only heated, the moisture in the corrugated cardboard base material 7 is vaporized to be hardened so as to produce cracks therein.

Figure 3:
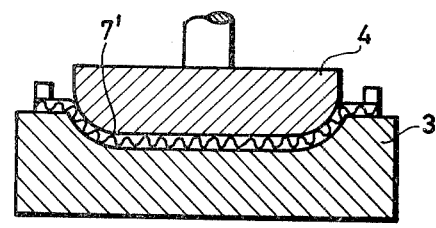
FIG. 3 illustrates the forming die forming the corrugated cardboard base material.

The thus plasticized corrugated cardboard base material is removed out of the heating and moistened furnace 1 and placed on a lower die portion 3 of a forming die as shown in FIG. 3. Thereafter, an upper die portion 4 is lowered to press the corrugated cardboard base material 7 between the upper and lower die portions 3 and 4 under a low temperature to shape it in a predetermined manner. The forming die may have a low temperature of 30° C. to 70° C., for example. In mass-production, the forming die may be positively cooled to maintain the temperature of the forming die. The corrugated cardboard base material can be shaped in 2 to 5 seconds.

Figure 4:
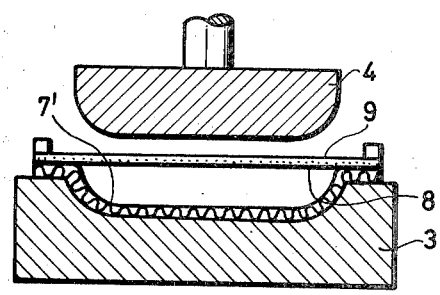
FIG. 4 illustrates the forming die having a covering sheet disposed on the lower die portion thereof.
Figure 5:
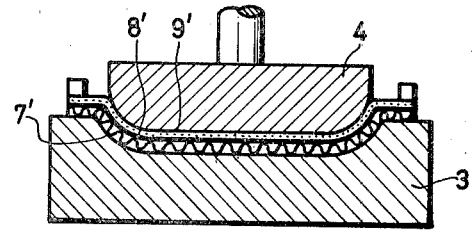
FIG. 5 illustrates the forming die forming the covering sheet to bond it to the corrugated cardboard base material.

After shaping the corrugated cardboard base material, as shown in FIG. 4, the upper die portion 4 is lifted and a covering sheet 9 having a thermally melting sheet 8 provided thereon is disposed on the lower die portion 3 so that the thermally melting sheet 8 is faced toward the shaped corrugated cardboard base material 7' in the lower die portion 3. Thereafter, as shown in FIG. 5, the upper die portion 4 is lowered so that the covering sheet 9 is pressed. At that time, the thermally melting sheet 8 is melted by the heat from the preheated shaped corrugated cardboard base material 7' to integrally bond the shaped covering sheet 9' to the shaped corrugated cardboard base material 7' via the thermally melting sheet 8'. The covering sheet may comprise a laminate of a thin upper sheet and a thick damping sheet such as a sponge sheet which sticks to the upper sheet.

After the shaped corrugated cardboard base material 7' having the shaped covering sheet 9' integrally bonded thereto is cooled, it is removed out of the forming die. Since the forming die has the low temperature of 30° C. to 70° C. as aforementioned, the product can be quickly cooled without forced cooling means.

Figure 6:
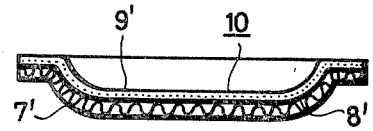
FIG. 6 is a cross sectional view of the product.

In this manner, the product 10 can be produced as shown in FIG. 6. Since the product 10 is formed by the forming die having the low temperature, no deformation occurs due to back spring thereof, resulting in a predetermined shape of the product 10. Also, it will be noted that since the corrugated cardboard base material is preheated and moistened and pressed in the forming die of low temperature, the time during which it is pressed and cooled can be shorter, with the result that working time can be also shorter. Furthermore, since the corrugated cardboard base material is pressed for shaping only after being heated and moistened in a flat state so as to be plasticized, it can be easily and properly shaped. This causes the product to have a high quality. Finally, since it can be effectively worked, since the covering sheet need not be of heat-resistant material and also since heating and moistening the corrugated cardboard base material can be effectively made in the furnace, the product can be inexpensively obtained.

Although one preferred embodiment of the invention has been described and illustrated with reference to the accompanying drawing, it will be understood by those skilled in the art that various changes and modifications may be made without departing from the spirit and scope of the invention, which is intended to be defined only by the appended claims.

What is claimed is:

1. A method of producing interior material of corrugated cardboard comprising the steps of:
   plasticizing in an oven corrugated cardboard base material by heating and moistening;
   pressing the thus plasticized corrugated cardboard base material in a forming die separate from said oven and of low temperature in the range from 30° to 70° C. to shape it in a predetermined manner;
   placing a covering sheet having a thermally melting sheet provided thereon so as to be faced toward the thus shaped corrugated cardboard base material;
   and thereafter pressing said covering sheet in said low temperature forming die to melt said thermally melting sheet by the heat of said shaped corrugated cardboard base material to thereby bond said covering sheet to said shaped corrugated cardboard base material.

2. A method of producing interior material of corrugated cardboard as set forth in claim 1, and wherein said corrugated cardboard base material is heated to the temperature of 150° C. to 200° C. during said plasticizing step.

3. A method of producing interior material of corrugated cardboard as set forth in claim 1, and wherein said corrugated cardboard base material is moistened to the humidity of 5 to 20% during said plasticizing.

4. A method of producing interior material of corrugated cardboard as set forth in claim 1, and cooling said forming die so as to maintain the low temperature of said forming die.

5. A method of producing interior material of corrugated cardboard as set forth in claim 1, and wherein said covering sheet comprises a laminate of an upper sheet and a damping sheet which sticks to said upper sheet.

6. A method of producing interior material of corrugated cardboard as set forth in claim 1, wherein said plasticizing step is carried out with said corrugated cardboard in a substantially flat plane.

* * * * *